(12) United States Patent
Nagavarapu et al.

(10) Patent No.: US 10,393,015 B2
(45) Date of Patent: Aug. 27, 2019

(54) METHODS AND SYSTEMS FOR TREATING FUEL GAS

(71) Applicants: Ananda K. Nagavarapu, Houston, TX (US); Donald J. Victory, Sugar Land, TX (US); Robert D. Denton, Bellaire, TX (US)

(72) Inventors: Ananda K. Nagavarapu, Houston, TX (US); Donald J. Victory, Sugar Land, TX (US); Robert D. Denton, Bellaire, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 327 days.

(21) Appl. No.: 15/587,829

(22) Filed: May 5, 2017

(65) Prior Publication Data

US 2018/0016977 A1  Jan. 18, 2018

Related U.S. Application Data

(60) Provisional application No. 62/362,472, filed on Jul. 14, 2016.

(51) Int. Cl.
*F02C 3/22* (2006.01)
*F02C 6/00* (2006.01)
(Continued)

(52) U.S. Cl.
CPC ............... *F02C 3/22* (2013.01); *C10G 5/06* (2013.01); *F02C 3/28* (2013.01); *F02C 6/00* (2013.01); *F25J 3/0209* (2013.01); *F25J 3/0233* (2013.01); *F25J 3/0242* (2013.01); *F25J 3/061* (2013.01); *F25J 3/0635* (2013.01); *F25J 3/0645* (2013.01);
(Continued)

(58) Field of Classification Search
CPC ...... F02C 3/22; F02C 3/28; F02C 6/00; C10G 5/06; F25J 3/0209; F25J 3/0233; F25J 3/0242; F25J 3/061; F25J 3/0635; F25J 3/0645
See application file for complete search history.

(56) References Cited

U.S. PATENT DOCUMENTS 4,435,198 A * 3/1984 Gray .................. F25J 1/0022
62/622
4,720,294 A * 1/1988 Lucadamo .............. C07C 7/04
62/627
(Continued)

*Primary Examiner* — Steven M Sutherland
(74) *Attorney, Agent, or Firm* — ExxonMobil Upstream Research Company-Law Department

(57) ABSTRACT

Methods and systems for treating a compressed gas stream. The compressed gas stream is cooled and liquids are removed therefrom to form a dry gas stream, which is chilled in a first heat exchanger. Liquids are separated therefrom, thereby producing a cold vapor stream and a liquids stream. A first part of the cold vapor stream is expanded to produce a cold two-phase fluid stream, and a second part of the cold vapor stream is cooled to form a cooled reflux stream. Various streams are fed into a separation column to produce a cold fuel gas stream and a low temperature liquids stream. The second part of the cold vapor stream is cooled by the cold fuel gas stream, which becomes a warmed fuel gas stream that is compressed and used with the low-temperature liquids stream to chill the dry gas stream and to cool the compressed gas stream.

30 Claims, 8 Drawing Sheets

(51) Int. Cl.
*F02C 3/28* (2006.01)
*C10G 5/06* (2006.01)
*F25J 3/06* (2006.01)
*F25J 3/02* (2006.01)

(52) U.S. Cl.
CPC ........ *F25J 2200/02* (2013.01); *F25J 2200/70* (2013.01); *F25J 2205/04* (2013.01); *F25J 2220/66* (2013.01); *F25J 2220/68* (2013.01); *F25J 2230/08* (2013.01); *F25J 2230/32* (2013.01); *F25J 2235/60* (2013.01); *F25J 2240/02* (2013.01); *F25J 2290/72* (2013.01)

(56) References Cited

U.S. PATENT DOCUMENTS

| | | | |
|---|---|---|---|
| 5,718,872 A | 2/1998 | Khanmamedov | 422/168 |
| 5,992,175 A * | 11/1999 | Yao | F25J 3/0209 |
| | | | 62/621 |
| 6,551,470 B1 | 4/2003 | Webb | 423/574.1 |
| 7,429,287 B2 * | 9/2008 | Frantz | B01D 53/226 |
| | | | 95/47 |
| 8,298,505 B2 | 10/2012 | Zhai et al. | 423/574.1 |
| 2006/0283207 A1* | 12/2006 | Pitman | F25J 3/0209 |
| | | | 62/620 |
| 2008/0087041 A1* | 4/2008 | Denton | F25J 3/0214 |
| | | | 62/618 |
| 2010/0146022 A1 | 6/2010 | Hart A et al. | 62/601 |
| 2011/0167868 A1* | 7/2011 | Pierce | F25J 3/0209 |
| | | | 62/620 |
| 2012/0085218 A1* | 4/2012 | Popa Tudor | G10D 9/02 |
| | | | 84/383 R |
| 2012/0137726 A1* | 6/2012 | Currence | F25J 3/0209 |
| | | | 62/613 |

\* cited by examiner

100

METHODS AND SYSTEMS FOR TREATING FUEL GAS

CROSS REFERENCE RELATED APPLICATIONS

This application claims the priority benefit of U.S. Patent Application 62/362,472 filed Jul. 14, 2016 entitled METHODS AND SYSTEMS FOR TREATING FUEL GAS, the entirety of which is incorporated by reference herein.

This application is related to U.S. patent application Ser. No. 14/671,029, "Methods for Producing a Fuel Gas Stream," filed Mar. 27, 2015, which claims priority to U.S. Provisional Patent Application No. 61/977,513, "Methods for Producing a Fuel Gas Stream," filed Apr. 9, 2014, the disclosures of which are incorporated herein by reference.

FIELD

The present techniques are generally related to gas purification. In particular, the present techniques provide for purification of a raw natural gas to be utilized as a fuel gas during offshore production.

BACKGROUND

This section is intended to introduce various aspects of the art, which may be associated with exemplary embodiments of the present techniques. This description is believed to assist in providing a framework to facilitate a better understanding of particular aspects of the present techniques. Accordingly, it should be understood that this section should be read in this light, and not necessarily as admissions of prior art.

To meet increasing energy demand, oil and gas will continue to be a major source for the energy needs of the world. Specifically, offshore hydrocarbon production is critical in meeting that growing demand. In the 1940's, offshore production began in the state of Louisiana and advancements in technology have expanded the industry into deeper waters and into more remote locations. Over the last six decades, offshore production has increased tremendously. Currently, approximately 30% of the world oil and gas production comes from offshore production and this percentage is expected to increase in the future.

During offshore hydrocarbon production, crude oil and raw natural gas produced from a well is harvested from underground reservoirs to be brought to the surface. Additional, processing may separate the raw natural gas from the crude oil. In many cases, raw natural gas contains unacceptable levels of higher hydrocarbons, carbon dioxide ($CO_2$), hydrogen sulfide ($H_2S$), and other impurities, so that it cannot be burned as a fuel on the platform without initially undergoing further processing.

For example, $H_2S$ or $O_{3+}$ in the raw natural gas may cause corrosion and carbon build-up in most offshore production equipment. Additionally, high levels of $CO_2$ in the raw natural gas may lower the BTU value of the fuel gas. These impurities may compromise engine operation, increase operational downtime, or emit harmful emissions into the environment. However, despite the presence of contaminants and impurities in the raw gas that may render its use undesirable, the raw natural gas may be the only fuel available to operate power generators, turbines, and compressor stations in remote locations and on offshore platforms. Thus, facilities to condition the raw natural gas may be implemented during offshore production.

U.S. Patent Application Publication No. 2010/0146022 by Hart et al. discloses a process for the removal of a sour species from a dehydrated natural gas feed stream. The dehydrated natural gas feed stream is cooled to conditions where a slurry of solid sour species and hydrocarbon liquids is formed together with a gaseous stream containing gaseous sour species. The gaseous stream containing gaseous sour species is then separated from the slurry and treated with a liquid solvent, thereby forming a liquid solution of the sour species and a dehydrated sweetened natural gas product stream. An apparatus for removing sour species from a dehydrated natural gas feed stream may include a vessel with a solids formation zone in fluid communication with a gas solvation zone. The solids formation zone is configured to facilitate formation of a slurry of solid sour species and hydrocarbon liquids and a gaseous stream containing gaseous sour species. The gas solvation zone is configured to facilitate formation of a liquid solution of sour species. The apparatus has an inlet for introducing the dehydrated natural gas feed stream to the solids formation zone, a conduit configured to direct the gaseous stream from the solids formation zone to the gas solvation zone, and an inlet for introducing liquid solvent into the gas solvation zone.

U.S. Pat. No. 5,718,872 to Khanmamedov discloses an apparatus for controlling the hydrogen sulfide concentration in an acid gas stream and the hydraulic loading of a sulfur recovery unit of the type having an absorber for contacting a sour gas stream with an absorbent, a regenerator for regenerating the absorbent to form an acid gas stream and a recycle system.

U.S. Pat. No. 6,551,470 to Smith et al. discloses the removal of hydrogen sulfide from gas streams by reacting the hydrogen sulfide with sulfur dioxide to produce sulfur. The reaction is effected in a reaction medium comprising a non-aqueous Lewis base with a $pK_b$ value of about 6 to about 11. The reaction medium possesses a specific combination of properties: a) absorbs sulfur dioxide and reacts chemically therewith to form a reaction product; b) absorbs hydrogen sulfide; c) removes the hydrogen sulfide from the gas stream through contact of the gas stream with the reaction medium in the presence of free sulfur dioxide, and/or the reaction product; d) acts as a catalyst for the overall reaction of the hydrogen sulfide with sulfur dioxide to produce sulfur; and e) has the capacity to absorb sulfur dioxide.

U.S. Pat. No. 7,429,287 to Frantz discloses a method and a system for sweetening a raw natural gas feed stream using a multi-stage membrane separation process. The method and system also include use of a gas turbine which operates with an impure fuel gas stream as derived from a permeate gas stream obtained in at least the second stage of a membrane separation process, or later stages if more than two stages are employed. In embodiments, the gas turbine is coupled with an electrical generator, which generates electrical power that drives a compressor for the second stage (or higher) of the membrane separation process, as well as other process equipment associated therewith, such as air coolers and process pumps. Alternatively, the gas turbine can be coupled mechanically to the compressor employed. In other embodiments, the power generated by the turbine generator combination can be exported to a local power grid. In other embodiments, the turbine generator is a micro-turbine generator (MTG) which can be used in applications where space is limited, such as an offshore platform or other oil/gas production facility or on board a floating vessel.

U.S. Pat. No. 8,298,505 to Zhai et al. discloses a process for treating a gas stream comprising hydrogen sulfide. The process includes the steps of mixing a first gas stream comprising hydrogen sulfide with a second stream comprising sulfur dioxide to produce a combined stream, whereby elemental sulfur is produced by a reaction between the hydrogen sulfide and the sulfur dioxide. The process includes the step of removing elemental sulfur, and optionally water, from the combined stream. The process also includes the step of oxidizing at least some of the elemental sulfur to form sulfur dioxide for use in the second stream, where the reaction is conducted at a temperature of from 15 to 155° C. and a pressure of at least 3 MPa.

Additionally, other gas treating processes may exist for the purification of gas. However, the currently available systems take up significant space and are difficult to operate in remote locations.

SUMMARY

In an aspect, a method for treating a compressed gas stream is disclosed. The compressed gas stream is cooled to form a cool compressed gas stream. Liquids are removed from the cool compressed gas stream to form an overhead vapor stream. The overhead vapor stream is dehydrated to form a dry gas stream. The dry gas stream is chilled in a first heat exchanger to produce a dry cold fluid stream. Liquids are separated from the dry cold fluid stream, thereby producing a cold vapor stream and a liquids stream. A first part of the cold vapor stream is expanded in a turbo-expander to produce a cold two-phase fluid stream. A second part of the cold vapor stream is cooled in a reflux heat exchanger to form a cooled reflux stream. The liquids stream, the cold two-phase fluid stream, and the cooled reflux stream are fed into a separation column to produce a cold fuel gas stream and a low temperature liquids stream. The cold fuel gas stream is used to cool the second part of the cold vapor stream in the reflux heat exchanger, the cold fuel gas stream becoming a warmed fuel gas stream. The warmed fuel gas stream is compressed in a compressor to form a compressed cold fuel gas stream. The compressed cold fuel gas stream and the low-temperature liquids stream are used to chill the dry gas stream in the first heat exchanger. The compressed cold fuel gas stream and the low-temperature liquids stream are used to cool the compressed gas stream.

In another aspect, a method for treating a compressed gas stream is disclosed. The compressed gas stream is cooled to form a cool compressed gas stream. Liquids are removed from the cool compressed gas stream to form a dry gas stream. The dry gas stream is chilled in a first heat exchanger to produce a dry cold fluid stream. Liquids are separated from the dry cold fluid stream, thereby producing a cold vapor stream and a liquids stream. A first part of the cold vapor stream is expanded in a turbo-expander to produce a cold two-phase fluid stream. A second part of the cold vapor stream is cooled in a reflux heat exchanger to form a cooled reflux stream. The liquids stream, the cold two-phase fluid stream, and the cooled reflux stream are fed into a separation column to produce a cold fuel gas stream and a low temperature liquids stream. The cold fuel gas stream is used to cool the second part of the cold vapor stream in the reflux heat exchanger, the cold fuel gas stream becoming a warmed fuel gas stream. The warmed fuel gas stream is compressed in a compressor to form a compressed cold fuel gas stream. The compressed cold fuel gas stream and the low-temperature liquids stream are used to chill the dry gas stream in the first heat exchanger. The compressed cold fuel gas stream and the low-temperature liquids stream are used to cool the compressed gas stream.

In another aspect, a system for producing a fuel gas stream is disclosed. An inlet heat exchanger cools a compressed gas stream to form a cool compressed gas stream. A first separator removes liquids from the cool compressed gas stream to form an overhead vapor stream. A dehydrator dehydrates the overhead vapor stream to form a dry gas stream. A first heat exchanger chills the dry gas stream to produce a dry cold fluid stream. A second separator separates liquids from the dry cold fluid stream, thereby producing a cold vapor stream and a liquids stream. A turbo-expander expands a first part of the cold vapor stream to produce a cold two-phase fluid stream. A reflux heat exchanger cools a second part of the cold vapor stream to form a cooled reflux stream. A separation column receives the liquids stream, the cold two-phase fluid stream, and the cooled reflux stream and produces a cold fuel gas stream and a low temperature liquids stream, wherein the cold fuel gas stream is used to cool the second part of the cold vapor stream in the reflux heat exchanger, the cold fuel gas stream thereby becoming a warmed fuel gas stream. A compressor compresses the warmed fuel gas stream to form a compressed cold fuel gas stream. The compressed cold fuel gas stream and the low-temperature liquids stream are fed to the first heat exchanger to chill the dry gas stream therein. The compressed cold fuel gas stream and the low-temperature liquids stream are further fed to the inlet heat exchanger to cool the compressed gas stream therein.

DESCRIPTION OF THE DRAWINGS

The advantages of the present disclosure are better understood by referring to the following detailed description and the attached drawings, in which.

DETAILED DESCRIPTION

Figure 1:
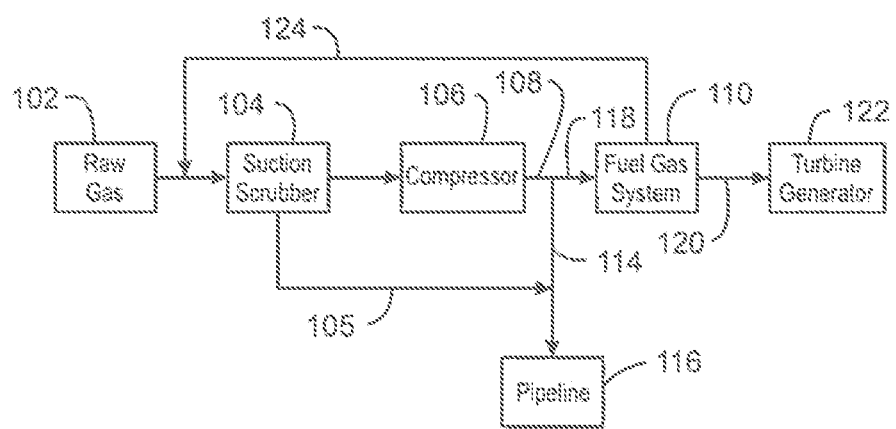
FIG. 1 is a block diagram of a gas conditioning and partial sweetening system in accordance with one or more embodiments of the present disclosure.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The term "conditioned gas" refers to a purified gas where a percentage of higher molecular weight hydrocarbon containments in an initial hydrocarbon stream has been removed. Conditioned gas is also referred to as a "Fuel Gas."

The term "feed stream" refers to a composition prior to any treatment, such treatment including cleaning, dehydration, and/or scrubbing.

The term "gas treatment system" refers to the process described herein, which removes a sufficient percentage of the compounds from the feed stream, so that the product can be used as a fuel on a production platform.

The term "raw gas stream" refers to a hydrocarbon fluid stream wherein the fluids are primarily in a gaseous phase, and which has not undergone steps to remove carbon dioxide, hydrogen sulfide, or other acidic components.

The terms "substantially", "substantial," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

The term "superheated" means warming a gas above its saturation or dew point.

The term "sweetened gas" refers to a fluid stream in a substantially gaseous phase where at least a portion of acid gas components have been removed.

The term "waste gas" or "waste stream" refers to any gas stream comprising $CO_2$, $H_2S$, higher molecular weight hydrocarbons, or any other type of impurities and contaminants removed from the feed gas to produce a hydrocarbon product suitable for use as a fuel.

Overview

The embodiments of the present disclosure provide methods and systems for purifying a raw natural gas to produce a fuel gas stream. The method may include a suction scrubber to initially separate out liquids and entrained solids within the raw natural gas to produce a feed gas. The feed gas may be compressed to produce a compressed feed gas where a portion of the compressed feed gas is fed into a fuel gas treatment system for purification. Another portion of the compressed feed gas may bypass the fuel gas treatment system and may be sent to pipeline for sale.

The fuel gas treatment system is utilized to split the compressed feed gas into a waste stream and a low-sulfur conditioned gas stream. The conditioned gas stream may be directed into a turbine generator for combustion as an energy source or used for any other fuel purpose or some other process purpose. The waste stream is fed back into the raw natural gas upstream of the suction scrubber.

FIG. 1 is a block diagram of a gas conditioning and partial sweetening system 100 in accordance with one or more embodiments of the present disclosure. The system 100 may begin by directing a raw gas 102 into a suction scrubber 104, such as a knockout drum, among others. The suction scrubber 104 may be utilized to separate, collect, and remove liquids 105 from the raw gas 102 prior to entering a compressor 106. By removing the liquids 105, the suction scrubber 104 may act to prevent the liquids 105 from entering the compressor 106, which may increase the longevity of the component life of the compressor 106 and other downstream equipment. The suction scrubber 104 may be located between an upstream raw gas supply and an inlet nozzle of the compressor 106 so as to be upstream of the compressor 106.

The compressor 106 may form a compressed feed gas 108 and may further purify the compressed feed gas 108 by removing any impurities. The type of compressor utilized may depend on the gas pressure required downstream for a fuel gas system 110. In operation, the compressor 106 may utilize a turbine, a motor, or an engine for power generation.

A majority portion 114 of the compressed feed gas 108, e.g., greater than about 85%, about 90%, about 95%, or more, is sent to a pipeline 116 for processing at a facility, such as an onshore facility. The liquids 105 removed by the suction scrubber 104 may be joined with this flow to be separated and disposed at the onshore facility. However, a smaller portion 118 of the compressed feed gas 108, e.g., about 15%, about 10%, about 5%, or less, may be directed into the fuel gas system 110 to undergo additional treatment. In one or more embodiments, the smaller portion 118 of the compressed feed gas 108 that may be directed into the fuel gas system 110 may include less than about 15%, about 10%, about 5% or less of the compressed feed gas 108 produced by the compressor 106.

The fuel gas system 110 may be an expansion system utilized to liquefy, separate, and remove residual concentrations of contaminants, including $CO_2$ and $H_2S$, that may be present in the compressed feed gas 108. In particular, the fuel gas system 110 may expand the smaller portion 118 of the compressed feed gas 108 to cool the compressed feed gas 108 and condense out heavier hydrocarbons and acid gases. In operation, the refrigeration step of the fuel gas system 110 may cause the condensation of contaminants from the smaller portion 118 of the compressed feed gas 108, where the contaminants may be later separated and removed. A fuel gas product, e.g., a conditioned gas 120, may exit the fuel gas system 110 where it may be combusted in a turbine generator 122. Additionally, a waste stream 124 may exit the fuel gas system 110. The waste stream 124 may contain some natural gas, along with the other contaminants, such as the heavier hydrocarbons and acid gases, that can be recycled into the raw gas 102, located upstream of the suction scrubber 104. The portion of the conditioned gas 120 directed into the turbine generator 122 may include less than about 15%, 10%, or 5% of the gas sent into the pipeline 116, but substantially more gas than is in the waste stream 124.

Figure 2:
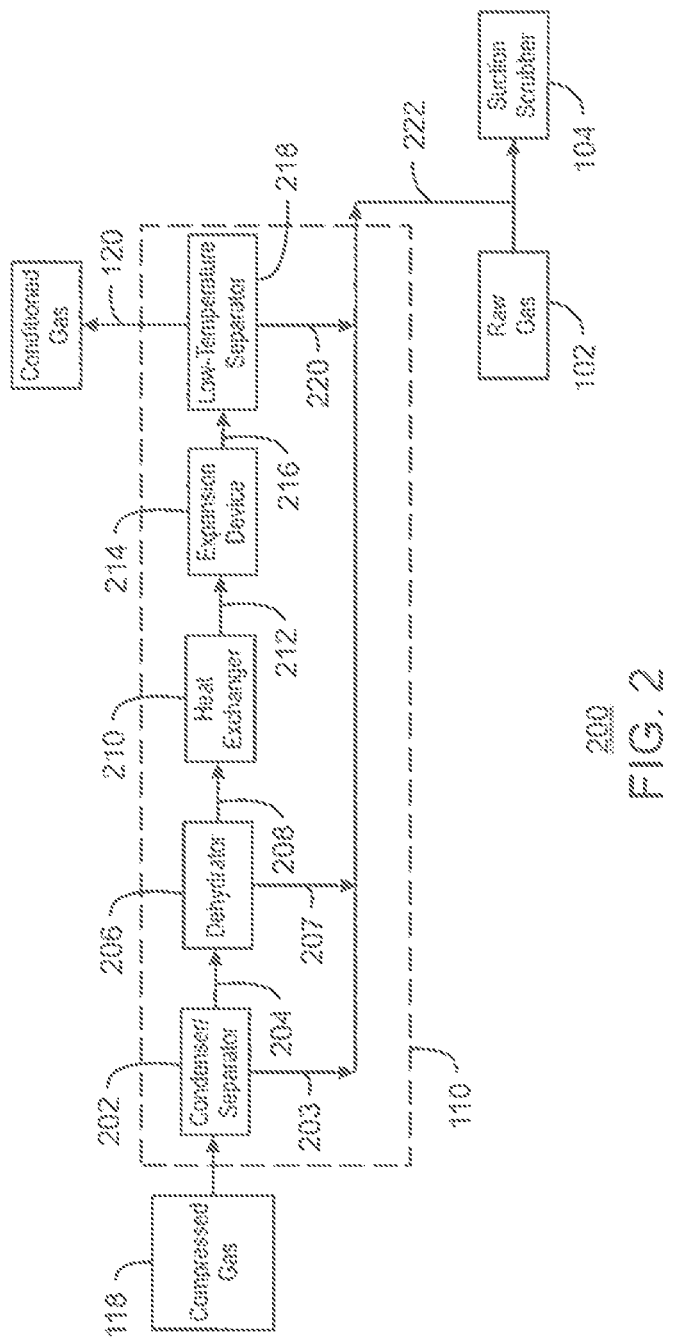
FIG. 2 is a block diagram of a detailed gas conditioning and partial sweetening system in accordance with one or more embodiments of the present disclosure.

FIG. 2 is a block diagram of a detailed gas conditioning and partial sweetening system 200 in accordance with one or more embodiments of the present disclosure. Like numbers are described with respect to FIG. 1. A compressed gas 118 enters the fuel gas system 110 and flows into a condenser/separator 202. In the condenser/separator 202, the compressed gas 118 is cooled to condense and separate out droplets of liquids to form a waste stream 203 and a cooled gas stream 204. Typical contaminants that may be removed in the waste stream 203 may include water, liquid hydrocarbons, well treating compounds, pipeline treating chemicals, and compressor oils. The removal of such contaminants may be beneficial before the cooled gas stream 204 is further processed downstream. For example, if the contaminants are allowed to proceed further through the fuel gas system 110, they may cause a number of operational problems including foaming, equipment fouling, and high corrosion rates.

The cooled gas stream 204 may enter a dehydrator 206 to remove water. In particular, dehydration may be required to prevent the formation of ice or hydrates that may plug downstream equipment leading to possible equipment malfunction and failure. Thus, the dehydrator 206 may aid in preventing flow restrictions and plugging in process conduits, e.g. valves and pipelines, and possibly in preventing corrosion formation on metal surfaces. The removal of the contaminants forms a rejected water stream 207 and a dry gas stream 208. In one or more embodiments, the dehydrator 206 may be a glycol dehydrator, a molecular sieve dehydrator, a deliquescent, or any other type of dehydrator.

The dry gas stream 208 flows into a heat exchanger 210. In operation, the heat exchanger 210 may exchange the heat of the dry gas stream 208 with other fluid streams to chill the dry gas stream 208 and to generate a chilled gas stream 212. This will be discussed in greater detail with respect to FIG. 4. The chilled gas stream 212 exiting the heat exchanger flows into an expansion device 214, which may be, for example, a Joule-Thompson valve (J-T valve) or other type of expander. The expansion device 214 reduces the pressure, further cooling the chilled gas stream 212 and condensing out other contaminants, such as natural gas liquids (NGLs) and other contaminated entrained liquids, from the chilled gas stream 212. A cold stream 216 flows from the expansion device 214 and into a cold separator, e.g., a low-temperature separator 218. The low-temperature separator 218 is used to separate the cold stream 216 into its respective liquid and vapor phases. In particular, the low-temperature separator 218 separates out a conditioned gas 120.

The conditioned gas 120 may be used as an energy source on an offshore platform or other remote locations. The conditioned gas 120 exiting the low-temperature separator 218 may include more than about 60%, about 75%, about 90%, or more of the total gas passing through the fuel gas system 110.

A recycle stream 220 may exit the low-temperature separator 218 and may be combined with the waste stream 203 and the rejected water stream 207. The combined streams 222 may flow into a raw gas 102 located upstream of a suction scrubber 104 to undergo another cycle of compression and purification.

Figure 3:
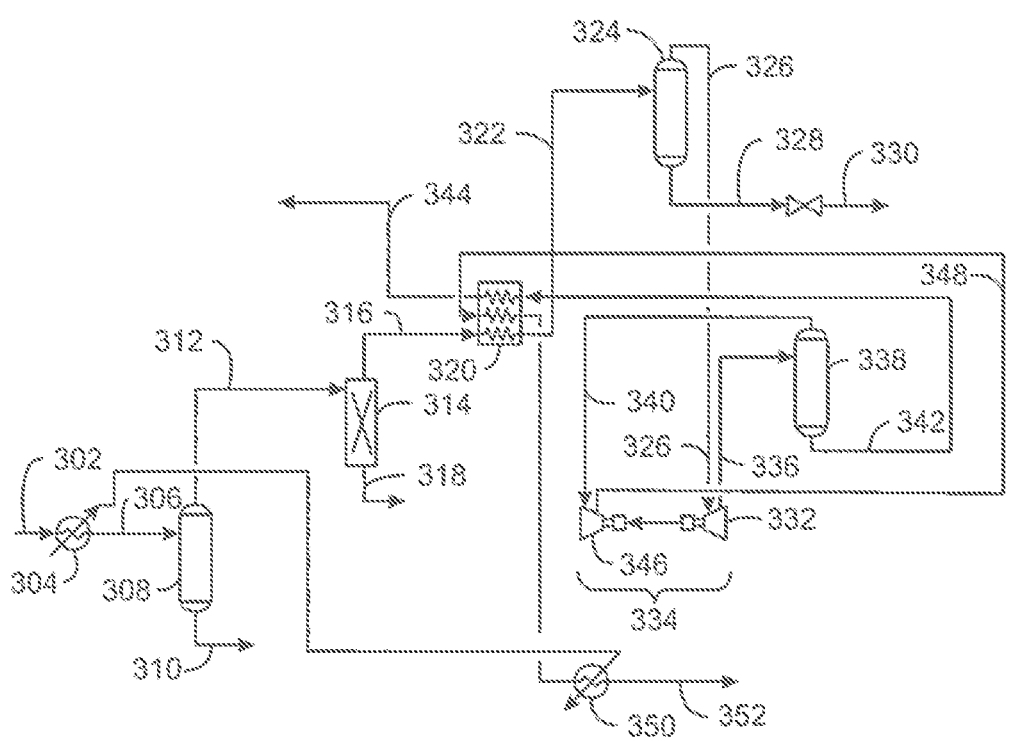
FIG. 3 is a drawing of a first embodiment of a gas conditioning and partial sweetening system for producing a fuel gas in accordance with one or more embodiments of the present disclosure.

FIG. 3 is a drawing of a first embodiment of a gas conditioning and partial sweetening system 300 for producing a fuel gas in accordance with one or more embodiments of the present disclosure. A compressed gas 302 is used as the feed gas to the fuel gas system 300. The compressed gas 302 is initially cooled by entering a heat exchanger 304. The compressed gas 302 may be at a pressure of about 1,900 psia and a temperature of about 150° F. (66° C.). The heat exchanger 304 may lower the temperature of the compressed gas 302 to about 80° F. (26.6° C.) to form a cool compressed gas 306. In one or more embodiments, the heat exchanger 304 may be a gas/gas shell-and-tube heat exchanger 304 where the compressed gas 302 may cool on the tube side of the heat exchanger 304 against a chilled fuel gas flowing on the shell side. The tubes of the heat exchanger 304 may be made of stainless steel since a portion of water may condense out of the compressed gas 302 during cooling.

The cool compressed gas 306 may flow into a high-pressure knock-out drum 308, which acts as a separator and removes any droplets of liquids 310 from the cool compressed gas 306, such as water and other liquids. The disposal of the liquids 310 is further discussed with respect to FIG. 4. Typical liquid contaminants may include liquid hydrocarbons, salt water, well treating compounds, pipeline treating chemicals, and compressor oils.

A vapor stream 312 from the high-pressure knock-out drum 308 enters into a dehydration unit 314 where substantially all of the remaining water vapor is removed to produce a dry gas 316. The dehydration unit 314 may be a molecular sieve unit utilized to reject a water stream 318. In some embodiments, the dehydrator 314 may include an enhanced absorption process (e.g. Super DRIZO™ glycol dehydration) or another adsorption process to remove the water vapor down to the level required for operation of the subsequent downstream cryogenic conditioning.

The dry gas 316 flows into a main heat exchanger 320 where it is chilled to produce a dry cold gas 322. As the system 300 may be located at a remote site, such as an offshore platform, the main heat exchanger 320 may be a compact design including a brazed aluminum heat exchanger (BAHX) or a printed circuit exchanger (PCHE), where both types of heat exchangers may be suitable for high-pressure service. The dry cold gas 322 may be fed into an expander device 324, such as a knock-out drum, to ensure the removal of any trace liquids that may interrupt or damage downstream equipment and to produce a cold vapor 326. As will be discussed in greater detail with respect to FIG. 4, a high-pressure liquid 328 removed from the expander device 324 may be flashed to produce a low-pressure liquid 330, which may be utilized for other processes or returned to a feed gas inlet.

The pressure and the temperature of the cold vapor 326 drops as it passes through the expander side 332 of a compander 334. The cold vapor 326 undergoes a near isentropic expansion via the expander side 332 to form a lower pressure two-phase fluid 336 including both vapor and liquid phases. The resulting two-phase fluid 336 enters a low-temperature separator 338 at a pressure just above the pressure of the low-temperature separator 338 to separate the two-phase fluid 336 into its vapor phase and liquid phase components.

The vapor phase from the low-temperature separator 338 is a cold fuel gas 340. The liquid phase component from the low-temperature separator 338 is a low-temperature liquid 342, which is richer in heavier hydrocarbons and $H_2S$ than the inlet two-phase fluid 336. The low-temperature liquid 342 is then partially vaporized in the main heat exchanger 320 to near ambient temperature (e.g., about 79° F. (26° C.)) to produce a vaporized liquid 344. As will be discussed in greater detail with respect to FIG. 4, the vaporized liquid 344 may mix with a raw gas stream located upstream of a compressor suction scrubber.

The cold fuel gas 340 passes through the compressor side 346 of the compander 334, where it is compressed to a required pressure suitable for use as fuel gas 348 to be used on an offshore platform. The fuel gas 348 is a conditioned gas since heavier hydrocarbon components, such as $C_{3+}$, and acid gases, such as $H_2S$ and $CO_2$, have been significantly removed from the initial feed gas. The compressed fuel gas 348 is superheated in the main heat exchanger 320 and additionally heated in a heat exchanger 350 to produce a superheated, sweetened fuel gas 352 suitable for offshore platform usage. Superheated may be defined to include warming the compressed fuel gas 348 above its dew point. The superheated, sweetened fuel gas 352 may be utilized to produce electricity via combustion in a turbine generator or used for other purposes in a combustion engine or heater.

Figure 4:
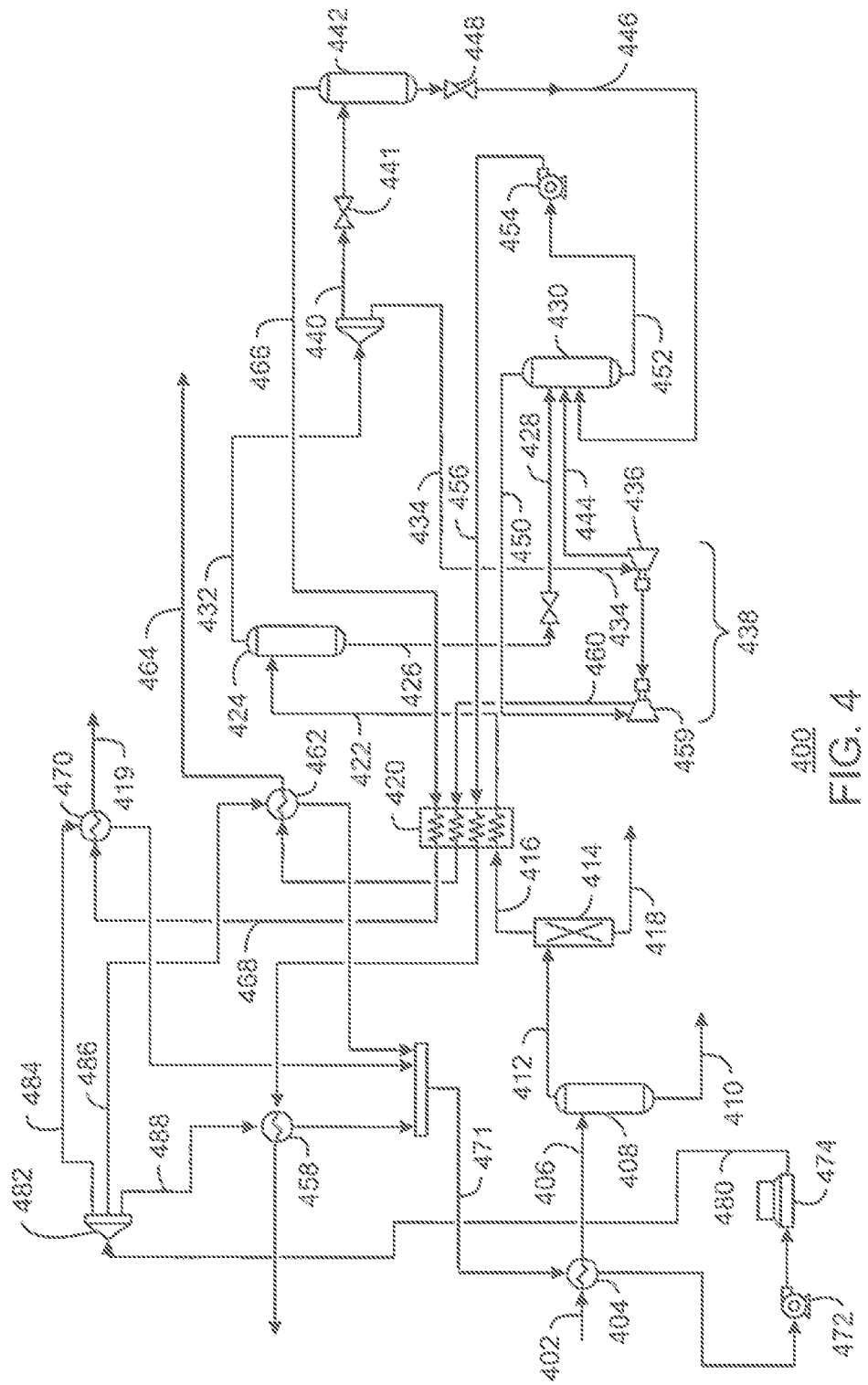
FIG. 4 is a drawing of a second embodiment of a gas conditioning and partial sweetening system for producing a fuel gas in accordance with one or more embodiments of the present disclosure.

FIG. 4 is a drawing of a second embodiment of a gas conditioning and partial sweetening system 400 for producing a fuel gas in accordance with one or more embodiments of the present disclosure. A compressed gas 402 is used as the feed gas to the fuel gas system 400. The compressed gas 402 enters the system 400 at a relatively high pressure (e.g., 1,900 psia) and at a temperature of about 150° F. (66° C.) and may flow into a chiller 404, where its temperature is lowered to about 80° F. (26.6° C.), in this embodiment. The cool compressed gas 406 may flow into a high-pressure knock-out drum 408 to remove and to separate any liquids 410, including water and hydrocarbons, within the cool compressed gas 406. The removed liquids 410 from the high-pressure knock-out drum 408 may be disposed of by flashing the liquids 410 into a compressor suction scrubber located downstream of the raw gas inlet.

An overhead vapor stream 412 from the high-pressure knock-out drum 408 enters into a dehydration unit 414 where substantially all of the remaining water vapor may be removed to produce a dry gas 416. The dry gas 416 may be suitable for use in a downstream cryogenic portion of the system 400. An adsorbed water stream 418 may be removed from the dehydration unit 414 using a superheated regeneration gas 419.

The dry gas 416 flows into a main heat exchanger 420 where it is chilled to about −15° F. (−26.1° C.), or below, to produce a dry cold fluid 422. The dry cold fluid 422 may contain contaminants such as $CO_2$, $H_2S$, and mercaptans that are condensed into liquids within the main heat exchanger 420.

Accordingly, the dry cold fluid 422 may be fed into an expander device 424, such as a knock-out drum, for removal of any entrained liquids 426. The entrained liquids 426 removed from the expander device 424 may be flashed to produce a lower pressure stream 428. The lower pressure stream 428 may be throttled into a low-temperature separator 430 for additional processing.

A cold vapor 432 exits the expander device 424 as an overhead product. The high-pressure cold vapor 432 may split into a first stream 434, which enters an expander side 436 of a compander 438, and a second stream 440. The second stream 440 may flash through a pressure letdown valve 441 and into a regeneration gas separator 442.

The expander 436 chills and depressures the first stream 434 using a near isentropic expansion to form a cold two-phase fluid 444. In one or more embodiments, the cold two-phase fluid 444 exits the expander 436 with a drop in pressure of at least about 1,420 psia and a drop in temperature of at least about −115° F. (−81.6° C.). The near isentropic pressure drop of the first stream 434 provides the necessary refrigeration to condense the contaminant-rich liquid phase present in the cold two-phase fluid 444.

The cold two-phase fluid 444 enters the low-temperature separator 430 at a pressure just above the pressure of the low-temperature separator 430, which may operate at a pressure of about 350 psia. Within the low-temperature separator 430, the cold two-phase fluid 444 may mix with the lower pressure stream 428 and a two-phase fluid, or recovered liquids 446, recovered from the regeneration gas separator 442. In one or more embodiments, a valve 448 may be placed upstream of the recovered liquids 446 to reduce its pressure before entering the low-temperature separator 430, which operates at a lower pressure. The low-temperature separator 430 separates the phases of the streams 426, 428, 444 to produce a cold fuel gas 450 and low-temperature liquids 452.

The pressure of the low-temperature liquids 452, which are rich in heavier hydrocarbons and $H_2S$, may be increased via a pump 454 so that the low-temperature liquids 452 may readily move through the system 400. Additionally, the increase in pressure may aid in providing a pressure level suitable for mixing of the low temperature liquids 452 with a raw gas stream located upstream of a compressor suction scrubber. After the low-temperature liquids 452 are re-pressurized, liquids 456 are partially vaporized and heated in the main heat exchanger 420 and further heated in a chiller 458 prior to entry into a raw gas stream upstream of a compression suction scrubber.

The cold fuel gas 450 passes through the compressor side 459 of the compander 438 where the pressure is increased for suitable use as a fuel gas on an offshore platform. In one or more embodiments, a suitable pressure may be about 805 psia. In operation, a compressed cold fuel gas 460, after leaving the compressor 459, is heated to about 55° F. (12.7° C.) in the main heat exchanger 420 and again in a chiller 462 to about 115° F. (46° C.) to generate a superheated, sweetened fuel gas 464. The compressed cold fuel gas 460 may be a conditioned gas since heavier hydrocarbon components, such as $C_{3+}$, and acid gases, such as $H_2S$ and $CO_2$, have been substantially removed from the initial feed gas, e.g., the compressed gas 402. The supply pressure of the superheated, sweetened fuel gas 464 may be about 785 psia. This pressure rating may be suitable for use in a gas turbine and other fuel gas consuming devices located on an offshore platform.

In one or more embodiments, the second stream 440 of high-pressure cold vapor that entered the regeneration gas separator 442 may be used to produce a cold regeneration gas 466 and the recovered liquids 446. As previously mentioned, the recovered liquids 446 may be flashed into the low-temperature separator 430. The cold regeneration gas 466 may flow overhead of the regeneration gas separator 442 and into the main heat exchanger 420. A heated regeneration gas 468 may be generated and further heated in a chiller 470. The superheated regeneration gas 419 may exit the fuel gas system 400 at a temperature of about 95° F. (35° C.) and a pressure of about 910 psia. The superheated regeneration gas 419 may then be heated to about 450° F. (232° C.) in a heater to regenerate the dehydrator 414, as previously discussed. The series of chillers 458, 462, and 470 may be part of a cooling water loop. The cooling water loop may use the refrigeration potential of the low-temperature liquids 452, the cold fuel gas 450, and the cold regeneration vapor 466 to chill a cooling fluid 471 before it flows into the high-pressure knock-out drum 408.

As shown in FIG. 4, the cooling fluids of the series of chillers 458, 462, 470 may be combined to generate the cooling fluid 471 (e.g. water, glycol/water). The cooling fluid 471 may be chilled by the chiller 404, pressurized by a pump 472, and chilled in an air cooler 474 to a temperature of about 140° F. (60° C.) to generate air-cooled cooling fluid 480. The air-cooled cooling fluid 480 may then be returned to the chillers 458, 462 and 470 as individual streams 484, 486, and 488, respectively, after the air-cooled cooling fluid 480 is split into such streams by a splitter 482. In one or more embodiments, the individual streams 484, 486, and 488 may be packaged in separate tube bundles within a single heat exchanger shell(s).

Figure 5:
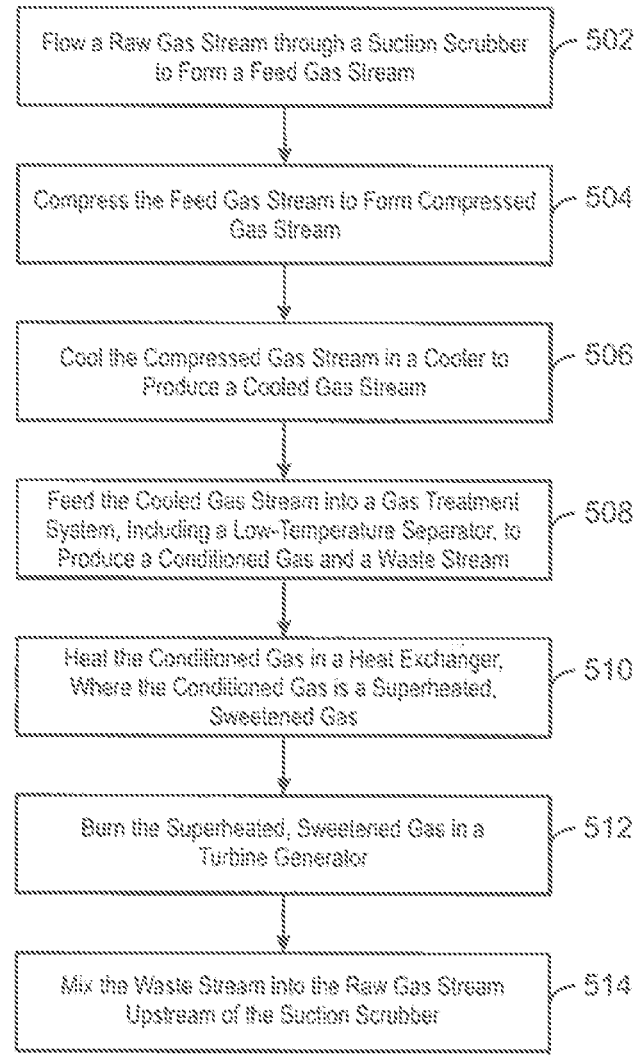
FIG. 5 is a block diagram for a method of producing a fuel gas stream in accordance with one or more embodiments of the present disclosure.

FIG. 5 is a block diagram for a method of producing a fuel gas stream in accordance with one or more embodiments of the present disclosure. The method begins at block 502 where a raw gas stream may flow into a suction scrubber to form a feed gas stream. The raw gas stream may flow from a hydrocarbon well reservoir and may include various contaminants that may be separated and removed before the raw gas stream is useable as a feed gas stream. At block 504, the feed gas stream may be compressed to form a compressed gas stream. Compressing the feed gas stream may also facilitate movement of the feed gas stream during additional processing steps. At block 506, the compressed gas stream may be cooled in a cooler to produce a cooled gas stream. At block 508, the cooled gas stream may be fed into a gas treatment system to remove liquid containments. The gas treatment may include a low-temperature separator to produce both a conditioned gas and a waste stream. The fuel gas system may be a cryogenic fuel gas system, where the term "cryogenic" may refer to a system that operates at temperatures below 150° F. (65.5° C.), and utilizes refrigeration methods to condense gases. The fuel gas system may only purify a smaller portion of the compressed gas stream, as a majority portion of the compressed gas stream may be directed to a pipeline for additional purification or commercialization. In some embodiments, the percentage of compressed gas that is purified may include less than about 20%, less than about 15%, less than about 10%, or less than about 5%.

At block 510, after sufficient liquids have been removed, the conditioned gas may be heated in a heat exchanger to generate a superheated, sweetened fuel gas. At block 512, the superheated, sweetened fuel gas may be utilized as an energy source for a remote offshore platform by being burned in a turbine generator. At block 514, the waste stream may mix with the raw gas stream upstream of the suction scrubber for additional purification.

Figure 6:
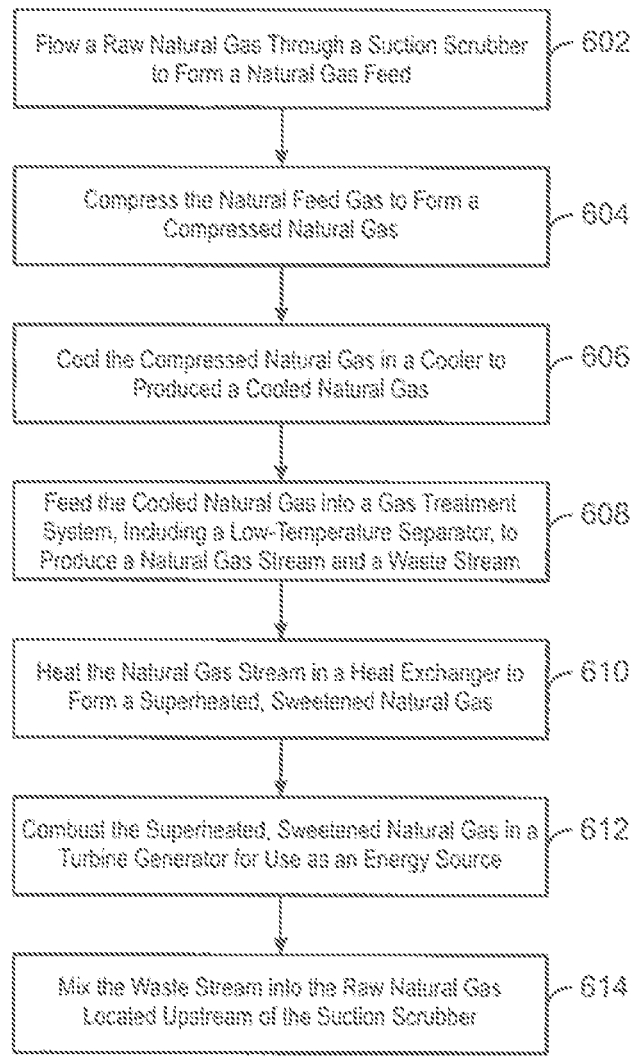
FIG. 6 is a block diagram for a method of producing a fuel gas stream from a compressed hydrocarbon stream in accordance with one or more embodiments of the present disclosure.

FIG. 6 is a block diagram 600 for a method of producing a fuel gas stream from a compressed natural gas. At block 602, a raw natural gas may flow into a suction scrubber to form a natural gas feed. At block 604, the natural feed gas may be compressed to form a compressed natural gas. At block 606, the compressed natural gas may be cooled to produce a cooled natural gas. At block 608, the cooled natural gas may be fed into a gas treatment system, where the system may include a low-temperature separator. The low-temperature separator may separate the cooled natural gas to produce a natural gas stream and a waste stream. The gas treatment system may additionally include a dehydrator, an expansion scrubber, and a cryogenic expander. At block 610, the natural gas stream may be heated in a heat exchanger to form a superheated, sweetened natural gas. At block 612, the superheated, sweetened natural gas may be combusted in a turbine generator for use as an energy source. At block 614, the waste stream may be mixed with a raw natural gas stream located upstream of a suction scrubber.

Figure 7:
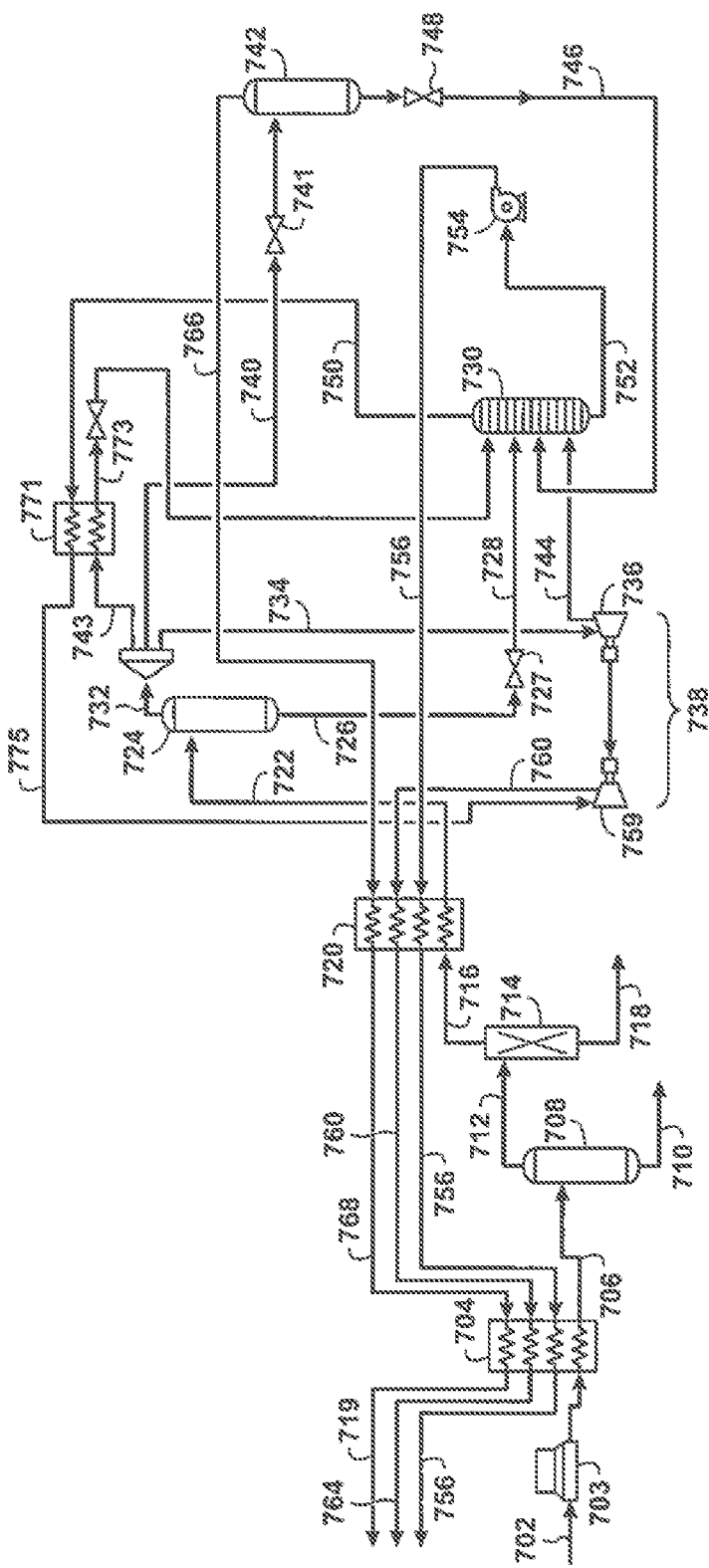
FIG. 7 is a drawing of a gas conditioning and partial sweetening system for producing a fuel gas in accordance with one or more aspects of the present disclosure.

FIG. 7 depicts a gas conditioning and partial sweetening system 700 for producing a fuel gas in accordance with one or more aspects of the present disclosure. A compressed gas 702 is used as the feed gas to the fuel gas system 700. The compressed gas 702 enters the system 700 at a pressure somewhat lower than what was used for the embodiment shown in FIG. 4. (e.g., 1,450 psia) and at a temperature of about 150° F. (85° C.). The compressed gas 702 may be cooled by an air cooler 703 to a temperature of about 52° C. and may be further cooled in an inlet heat exchanger 704, where its temperature is lowered to about 92° F. (33.4° C.), in this aspect. The cool compressed gas stream 706 may flow into a high-pressure knock-out drum 708 to remove and to separate any liquids, including water and hydrocarbons, within the cool compressed gas stream 706. The removed liquids stream 710 from the high-pressure knock-out drum 708 may be considered a flash stream and may be disposed of by flashing the liquids comprising the removed liquids stream 710 into a compressor suction scrubber (not shown) located downstream of the raw gas inlet.

An overhead vapor stream 712 from the high-pressure knock-out drum 708 enters a dehydration unit 714 where substantially all of the remaining water vapor may be removed to produce a dry gas stream 716. In an aspect, the dehydration unit 714 may be a molecular sieve dehydration system. In another aspect, the dehydration unit 714 may be a three-bed molecular sieve dehydration system. Other types of dehydration systems may be alternatively employed to sufficiently dehydrate the overhead vapor stream 712 for use in a subsequent cryogenic processes. The dry gas stream 716 may be suitable for use in a downstream cryogenic portion of the system 700. An adsorbed water stream 718 may be removed from the dehydration unit 714 using a superheated regeneration gas 719. The adsorbed water stream 718 may be a waste water stream that is fed into a raw gas stream upstream of a suction scrubber as shown in FIG. 2, or may be otherwise disposed of.

The dry gas stream 716 flows into a main heat exchanger 720 where it is chilled to about −40° F. (−40° C.), or below, to produce a dry cold fluid 722. The dry cold fluid 722 may contain contaminants such as $CO_2$, $H_2S$, and mercaptans, and some heavy hydrocarbons such as benzene, toluene, and the like, that are condensed into liquids within the main heat exchanger 720.

Accordingly, the dry cold fluid 722 may be fed into a separation device 724, such as a knock-out drum, for removal of any entrained liquids 726. The entrained liquids 726 removed from the separation device 724 may be flashed, using an expansion valve 727 or other pressure-reducing device, to produce a lower pressure stream 728. The lower pressure stream 728 may be throttled into a separator, which in this aspect is a separation column 730, for additional processing.

A high-pressure cold vapor stream 732 exits the separation device 724 as an overhead product. The high-pressure cold vapor stream 732 may split into a first stream 734, which enters an expander 736, which in an aspect may comprise an expander side of a compander 738; and a second stream 743, which may be a reflux stream. If the dehydration unit 714 uses molecular sieve technology, then a third stream 740 may be obtained from the high-pressure cold vapor stream 732. The third stream 740 may flash through a pressure letdown valve 741 and into a regeneration gas separator 742. In an aspect, most (e.g. 57.5%) of the high-pressure cold vapor stream 732 is directed to first stream 734, some (e.g., 30%) of the high-pressure cold vapor stream 732 is directed to the second stream 743, and the remainder (e.g., 12.5%) of the high-pressure cold vapor stream 732 is directed to the third stream 740. If the third stream 740 is not used, then the remainder (e.g., 12.5%) may be divided between the first and second streams 734, 743 and the regeneration gas separator 742 may be eliminated from system 700.

The expander 736, which may be a cryogenic turbo-expander, chills and depressurizes the first stream 734 using a near isentropic expansion to form a cold two-phase fluid stream 744. In one or more aspects, the cold two-phase fluid stream 744 exits the expander 736 with a drop in pressure to at least about 630 psia and a drop in temperature to at least about −99° F. (−72.8° C.). The near isentropic pressure drop of the first stream 734 in the expander 736 provides refrigeration to condense part of the contaminant-rich liquid phase present in the cold two-phase fluid stream 744.

The cold fluid two-phase fluid stream 744 enters the separation column 730 at a pressure just above the pressure of the separation column 730, which may operate at a pressure of about 624 psia. Within the separation column 730, the cold two-phase fluid stream 744 may mix with the lower pressure stream 728 and a two-phase fluid, or recovered liquids stream 746, recovered from the regeneration gas separator 742. In one or more aspects, a valve 748 may be placed upstream of the recovered liquids stream 746 to reduce its pressure before entering the separation column 730, which operates at a lower pressure. The second stream 743 is cooled in a reflux heat exchanger 771 to form a cooled reflux stream 773. The separation column 730 separates the phases of the lower pressure stream 728, the cold two-phase fluid stream 744, the recovered liquids stream 746 (if used), and the cooled reflux stream 773 to produce a cold fuel gas stream 750 and a low-temperature liquids stream 752.

The pressure of the low-temperature liquids stream 752, which is rich in heavier hydrocarbons and $H_2S$, may be increased via a pump 754 so that the low-temperature liquids stream 752, now pressurized low-temperature liquids stream 756, may readily move through the system 700. Additionally, the increase in pressure may aid in providing a pressure level suitable for mixing the pressurized low-temperature liquids stream 756 with a raw gas stream located upstream of a compressor suction scrubber. The pressurized low-temperature liquids stream 756 are partially vaporized and heated in the main heat exchanger 720 and further heated in the inlet heat exchanger 704 prior to entry into a raw gas stream upstream of a compression suction scrubber (not shown).

The cold fuel gas stream 750 exits from the top of separation column 730 and passes through the reflux heat exchanger 771, where it cools the second stream 743 and becomes a warmed fuel gas stream 775. The warmed fuel gas stream 775 enters a compressor 759, which in an aspect comprises the compressor side of the compander 738. The compressor 759 increases the pressure of the warmed fuel gas stream 775 for suitable use as a fuel gas on an offshore platform. In one or more aspects, a suitable pressure may be about 814 psia. In operation, a compressed cold fuel gas stream 760, after leaving the compressor 759, is heated to about 77° F. (25° C.) in the main heat exchanger 720 and again in the inlet heat exchanger 704 to about 116° F. (46.6° C.) to generate a superheated, sweetened fuel gas stream 764. The compressed cold fuel gas stream 760 may be a conditioned gas since heavier hydrocarbon components, such as $C_{3+}$, and acid gases, such as $H_2S$ and $CO_2$, have now been substantially removed from the initial feed gas, e.g., the compressed gas stream 702. The supply pressure of the superheated, sweetened fuel gas stream 764 may be about 797 psia. This pressure rating may be suitable for use in a gas turbine and other fuel gas consuming devices located on an offshore platform.

In one or more aspects, the third stream 740 of high-pressure cold vapor that enters the regeneration gas separator 742 may be used to produce a cold regeneration gas stream 766 and the recovered liquids stream 746. As previously mentioned, the recovered liquids stream 746 may be flashed into the separation column 730. The cold regeneration gas stream 766 may flow overhead of the regeneration gas separator 742 and into the main heat exchanger 720 to form a heated regeneration gas stream 768. The heated regeneration gas stream 768 may be further heated in the inlet heat exchanger 704 to form a superheated regeneration gas stream 719, which may exit the system 700 at a temperature of about 116° F. (46.6° C.) and a pressure of about 900 psia. The superheated regeneration gas stream 719 may then be heated to between 450° F. (232° C.) to 550° F. (298° C.) in a heater (not shown) to regenerate the dehydrator 714, as previously discussed. The inlet heat exchanger 704 may use the refrigeration potential of the pressurized low-temperature liquids stream 752, the compressed cold fuel gas stream 760, and the cold regeneration gas stream 766 to chill the compressed gas stream 702 before the compressed gas stream 702 flows into the high-pressure knock-out drum 708.

The superheated regeneration gas stream 719 may be heated to regenerate the molecular sieve dehydrator in the dehydration unit 714. The resulting wet regeneration gas may be mixed with one or more of the liquids in the removed liquids stream 710 coming from the high-pressure knockout drum 708 and the pressurized low-temperature liquids stream 756 and recycled to the suction of the main facility compressors (not shown). The superheated, sweetened fuel gas stream 764 exiting the inlet heat exchanger 704 is sufficiently above the hydrocarbon dew point to be introduced into gas turbines located on an offshore platform.

In the aspect depicted in FIG. 7, the separation column 730 operates at nearly 43 bar (623 psia). This is a lower pressure than what may be required by other systems, including system 400. The resulting fuel gas stream, which is the superheated, sweetened fuel gas stream 764, is available at above 54 bar (783 psia), which is a high enough inlet pressure for aero-derivative gas turbines. A higher degree of separation may be achieved in the superheated, sweetened fuel gas stream 764 if the separation column is operated at a lower pressure. This may result in fuel gas being available at a lower pressure. A small booster compressor (not shown) may be used to reach the desired gas turbine suction pressure. The heat exchangers proposed in the aspect depicted in FIG. 7 (i.e., inlet heat exchanger 704, main heat exchanger 720, and reflux heat exchanger 771) can be brazed aluminum or printed circuit heat exchangers, which are compact and highly efficient. Additionally, the aspect depicted in FIG. 7 does not require an external fluid system such as the water loop shown in FIG. 4. Therefore, the overall footprint of system 700 may be nearly half the size of system 400 while meeting a similar output specification at a lower inlet pressure. In addition to reducing the $H_2S$ content in the fuel gas, system 700 also removes heavy hydrocarbons from the fuel gas stream and recycles it with the main compression line, which presents favorable economics.

Variants of system 700 may include alternative sources of a reflux stream, which in FIG. 7 is depicted as second stream 743. For example, the reflux stream may be sourced from the compressed cold fuel gas stream 760 or the superheated, sweetened fuel gas stream 764. In such a configuration, the reflux stream would have a higher purity than that of system 700, which can further improve the separation that can be achieved in the separation column 730. Similarly, the compressor side of the compander may be situated at a different location (e.g. downstream of the main heat exchanger 720 or downstream of the inlet heat exchanger 704) to further enhance heat recovery. In another variation, any of expanders 332, 436, and 736 may be replaced or bypassed by a J-T valve (not shown). In such case the expansion therein is isenthalpic instead of isentropic. Furthermore, as no work is generated, the respective compressors 346, 459, and 759 could not be driven by the expanders and are out of service (i.e., flow bypassed). This configuration may be useful during start-up or when simplicity is required, or when redundancy is not kept for the turbo-expander.

Figure 8:
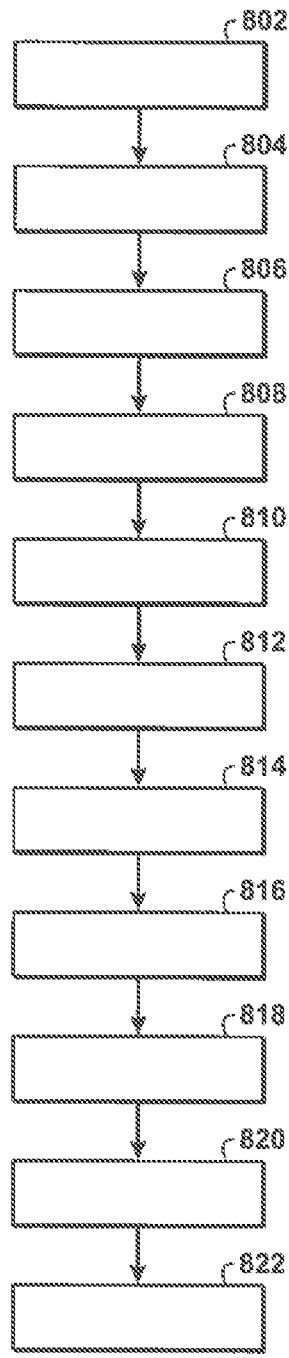
FIG. 8 is a block diagram for a method of producing a fuel gas stream from a compressed hydrocarbon stream in accordance with one or more aspects of the present disclosure.

FIG. 8 is a flowchart showing a method 800 of producing a fuel gas stream according to disclosed aspects. At block 802 the compressed gas stream is cooled to form a cool compressed gas stream. At block 804 liquids are removed from the cool compressed gas stream to form an overhead vapor stream. The overhead vapor stream may be dehydrated to form a dry gas stream. At block 806 the dry gas stream is chilled in a first heat exchanger to produce a dry cold fluid stream. At block 808 liquids are separated from the dry cold fluid stream, thereby producing a cold vapor stream and a liquids stream. At block 810 a first part of the cold vapor stream is expanded in a turbo-expander to produce a cold two-phase fluid stream. At block 812 a second part of the cold vapor stream is cooled in a reflux heat exchanger to form a cooled reflux stream. At block 814 the liquids stream, the cold two-phase fluid stream, and the cooled reflux stream are fed into a separation column to produce a cold fuel gas stream and a low temperature liquids stream. At block 816 the cold fuel gas stream is used to cool the second part of the cold vapor stream in the reflux heat exchanger, the cold fuel gas stream becoming a warmed fuel gas stream. At block 818 the warmed fuel gas stream is compressed in a compressor to form a compressed cold fuel gas stream. At block 820 the compressed cold fuel gas stream and the low-temperature liquids stream are used to chill the dry gas stream in the first heat exchanger. At block 822 the compressed cold fuel gas stream and the low-temperature liquids stream are used to cool the compressed gas stream.

Figure 9:
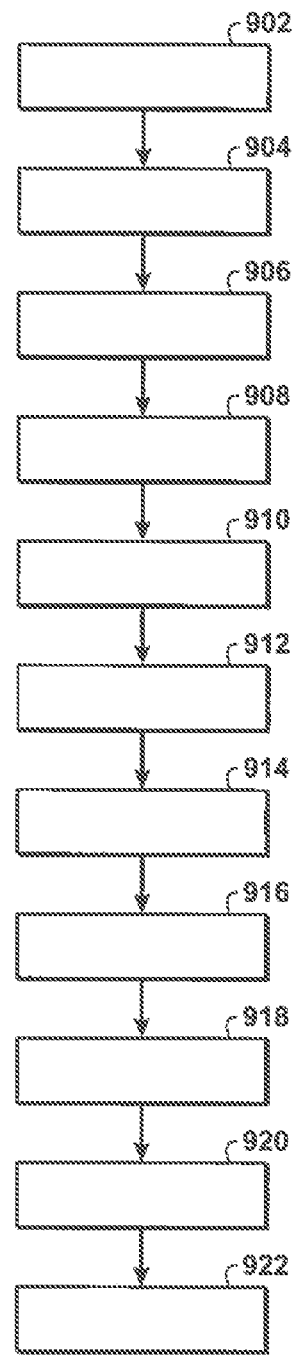
FIG. 9 is a block diagram for a method of producing a fuel gas stream from a compressed hydrocarbon stream in accordance with one or more aspects of the present disclosure.

FIG. 9 is a flowchart showing a method 900 of producing a fuel gas stream according to disclosed aspects. At block 902 the compressed gas stream is cooled to form a cool compressed gas stream. At block 904 liquids are removed from the cool compressed gas stream to form a dry gas stream. At block 906 the dry gas stream is chilled in a first heat exchanger to produce a dry cold fluid stream. At block 908 liquids are separated from the dry cold fluid stream, thereby producing a cold vapor stream and a liquids stream. At block 910 a first part of the cold vapor stream is expanded in a turbo-expander to produce a cold two-phase fluid stream. At block 912 a second part of the cold vapor stream is cooled in a reflux heat exchanger to form a cooled reflux stream. At block 914 the liquids stream, the cold two-phase fluid stream, and the cooled reflux stream are fed into a separation column to produce a cold fuel gas stream and a low temperature liquids stream. At block 916 the cold fuel gas stream is used to cool the second part of the cold vapor stream in the reflux heat exchanger, the cold fuel gas stream becoming a warmed fuel gas stream. At block 918 the warmed fuel gas stream is compressed in a compressor to form a compressed cold fuel gas stream. At block 920 the compressed cold fuel gas stream and the low-temperature liquids stream are used to chill the dry gas stream in the first heat exchanger. At block 922 using the compressed cold fuel gas stream and the low-temperature liquids stream are used to cool the compressed gas stream.

Raw natural gas produced from offshore platforms may be processed to remove contaminants and other impurities. The contaminants may include hydrogen sulfide, carbon dioxide, water, nitrogen, mercury, mercaptans, among others. In addition, the contaminants may include heavier hydrocarbons or natural gas liquids (NGLs) including ethane, propane, butane, and natural gasoline. The non-removal of such contaminants may cause damage to production equipment, thus possibility leading to increased maintenance cost or equipment failure. A fuel system may separate and remove the contaminants to provide a lean fuel gas, where a portion of the lean fuel gas may be combusted in a turbine generator to provide energy to various equipment on a remote offshore platform. The percentage of the lean fuel gas combusted in the turbine generator may be less than 20%, less than 15%, less than 10%, or less than 5% of the total amount of lean fuel gas produce by the fuel system. The remaining portion of the lean fuel gas may be recycled into an inlet of raw natural gas for continued purification.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for treating a compressed gas stream, comprising:
    cooling the compressed gas stream to form a cool compressed gas stream;
    removing liquids from the cool compressed gas stream to form an overhead vapor stream;
    dehydrating the overhead vapor stream to form a dry gas stream;
    chilling the dry gas stream in a first heat exchanger to produce a dry cold fluid stream;
    separating liquids from the dry cold fluid stream, thereby producing a cold vapor stream and a liquids stream;
    expanding a first part of the cold vapor stream in a turbo-expander to produce a cold two-phase fluid stream;
    cooling a second part of the cold vapor stream in a reflux heat exchanger to form a cooled reflux stream;
    feeding the liquids stream, the cold two-phase fluid stream, and the cooled reflux stream into a separation column to produce a cold fuel gas stream and a low temperature liquids stream;
    using the cold fuel gas stream to cool the second part of the cold vapor stream in the reflux heat exchanger, the cold fuel gas stream becoming a warmed fuel gas stream;
    compressing the warmed fuel gas stream in a compressor to form a compressed cold fuel gas stream;
    using the compressed cold fuel gas stream and the low-temperature liquids stream to chill the dry gas stream in the first heat exchanger; and
    using the compressed cold fuel gas stream and the low-temperature liquids stream to cool the compressed gas stream.

2. The method of claim 1, wherein the turbo-expander drives the compressor.

3. The method of claim 1, wherein a hydrogen sulfide concentration in the low-temperature liquids stream is higher than a hydrogen sulfide concentration in the compressed cold fuel gas stream.

4. The method of claim 1, wherein the compressed gas stream has a pressure of between 1,200 psia and 1,600 psia.

5. The method of claim 1, further comprising using the compressed cold fuel gas stream as a fuel for power generating equipment after the compressed cold fuel gas stream has been warmed in the first heat exchanger and the reflux heat exchanger.

6. The method of claim 1, further comprising increasing a pressure of the low-temperature liquids stream before chilling the dry gas stream in the first heat exchanger.

7. The method of claim 1, further comprising reducing a pressure of the liquids stream prior to feeding the liquids stream into the separation column.

8. The method of claim 1, further comprising:
feeding a third part of the cold vapor stream into a regeneration gas separator to produce a cold regeneration gas stream and a recovered liquids stream.

9. The method of claim 8, further comprising:
feeding the recovered liquids stream into the separation column.

10. The method of claim 8, further comprising:
using the cold regeneration gas stream to chill at least one of
the dry gas stream in at least one of the first heat exchanger, and
the compressed gas stream.

11. The method of claim 8, wherein dehydrating the overhead vapor stream is performed in a dehydrator, the method further comprising regenerating the dehydrator using the cold regeneration gas stream.

12. A method for treating a compressed gas stream, comprising:
cooling the compressed gas stream to form a cool compressed gas stream;
removing liquids from the cool compressed gas stream to form a dry gas stream;
chilling the dry gas stream in a first heat exchanger to produce a dry cold fluid stream;
separating liquids from the dry cold fluid stream, thereby producing a cold vapor stream and a liquids stream;
expanding a first part of the cold vapor stream in a turbo-expander to produce a cold two-phase fluid stream;
cooling a second part of the cold vapor stream in a reflux heat exchanger to form a cooled reflux stream;
feeding the liquids stream, the cold two-phase fluid stream, and the cooled reflux stream into a separation column to produce a cold fuel gas stream and a low temperature liquids stream;
using the cold fuel gas stream to cool the second part of the cold vapor stream in the reflux heat exchanger, the cold fuel gas stream becoming a warmed fuel gas stream;
compressing the warmed fuel gas stream in a compressor to form a compressed cold fuel gas stream;
using the compressed cold fuel gas stream and the low-temperature liquids stream to chill the dry gas stream in the first heat exchanger; and
using the compressed cold fuel gas stream and the low-temperature liquids stream to cool the compressed gas stream.

13. The method of claim 12, further comprising reducing a pressure of the liquids stream prior to feeding the liquids stream into the separation column.

14. The method of claim 12, wherein the turbo-expander drives the compressor.

15. The method of claim 12, wherein a hydrogen sulfide concentration in the low temperature liquids stream is higher than a hydrogen sulfide concentration in the compressed cold fuel gas stream.

16. The method of claim 12, wherein the compressed gas stream has a pressure of between 1,200 psia and 1,600 psia.

17. The method of claim 12, further comprising using the compressed cold fuel gas stream as a fuel for power generating equipment after the compressed cold fuel gas stream has been warmed in the first heat exchanger and the reflux heat exchanger.

18. The method of claim 12, further comprising increasing a pressure of the low-temperature liquids stream before chilling the dry gas stream in the first heat exchanger.

19. The method of claim 12, further comprising:
feeding a third part of the cold vapor stream into a regeneration gas separator to produce a cold regeneration gas stream and a recovered liquids stream.

20. The method of claim 19, wherein removing liquids from the cool compressed gas stream comprises dehydrating the cool compressed gas stream in a dehydrator, the method further comprising:
regenerating the dehydrator using the cold regeneration gas stream.

21. The method of claim 19, further comprising:
feeding the recovered liquids stream into the separation column.

22. The method of claim 19, further comprising:
using the cold regeneration gas stream to chill at least one of
the dry gas stream in at least one of the first heat exchanger, and
the compressed gas stream.

23. A system for producing a fuel gas stream, comprising:
an inlet heat exchanger that cools a compressed gas stream to form a cool compressed gas stream;
a first separator that removes liquids from the cool compressed gas stream to form an overhead vapor stream;
a dehydrator that dehydrates the overhead vapor stream to form a dry gas stream;
a first heat exchanger that chills the dry gas stream to produce a dry cold fluid stream;
a second separator that separates liquids from the dry cold fluid stream, thereby producing a cold vapor stream and a liquids stream;
a turbo-expander that expands a first part of the cold vapor stream to produce a cold two-phase fluid stream;
a reflux heat exchanger that cools a second part of the cold vapor stream to form a cooled reflux stream;
a separation column that receives the liquids stream, the cold two-phase fluid stream, and the cooled reflux stream and produces a cold fuel gas stream and a low temperature liquids stream, wherein the cold fuel gas stream is used to cool the second part of the cold vapor stream in the reflux heat exchanger, the cold fuel gas stream thereby becoming a warmed fuel gas stream; and
a compressor that compresses the warmed fuel gas stream to form a compressed cold fuel gas stream;
wherein the compressed cold fuel gas stream and the low-temperature liquids stream are fed to the first heat exchanger to chill the dry gas stream therein, and wherein the compressed cold fuel gas stream and the low-temperature liquids stream are further fed to the inlet heat exchanger to cool the compressed gas stream therein.

24. The system of claim 23, wherein the turbo-expander is driveably connected to the compressor.

25. The system of claim 23, further comprising a pump that increases the pressure of the low-temperature liquids stream before chilling the dry gas stream in the first heat exchanger.

26. The system of claim 23, further comprising reducing a pressure-reducing device that reduces a pressure of the liquids stream prior to feeding the liquids stream into the separation column.

27. The system of claim 23, further comprising a regeneration gas separator that separates a third part of the cold vapor stream to produce a cold regeneration gas stream and a recovered liquids stream.

28. The system of claim 27, wherein the cold regeneration gas stream is fed to the dehydrator to regenerate the dehydrator.

29. The system of claim 27, wherein the separation column further receives the recovered liquids stream and produces the cold fuel gas stream and the low temperature liquids stream therefrom.

30. The system of claim 27, wherein the cold regeneration gas stream is fed to the first heat exchanger to chill the dry gas stream therein, and further wherein the cold regeneration gas stream is fed to the inlet heat exchanger to cool the compressed gas stream therein.

* * * * *